May 10, 1966 D. A. CHRISTENSEN ET AL 3,250,540

FACE SEAL

Original Filed Nov. 6, 1961 2 Sheets-Sheet 1

May 10, 1966 D. A. CHRISTENSEN ETAL 3,250,540

FACE SEAL

Original Filed Nov. 6, 1961

United States Patent Office 3,250,540
Patented May 10, 1966

3,250,540
FACE SEAL
Dan A. Christensen, Woodside, and John H. Bradfute, Santa Clara, Calif., assignors to Federal-Mogul Corporation, a corporation of Michigan
Original application Nov. 6, 1961, Ser. No. 150,276, now Patent No. 3,185,488, dated May 25, 1965. Divided and this application Dec. 22, 1964, Ser. No. 438,807
1 Claim. (Cl. 277—89)

This invention related to improvements in face seals. This application is a division of application Serial No. 150,276, filed November 6, 1961, now Patent Number 3,185,488, granted May 25, 1965.

Most face seals heretofore known have been complex assemblies of a large number of individual elements. In addition to one or more pairs of sealing faces (each of which may itself be an assembly of several parts), there are usually several springs, a separate bellows to separate the sealed area from the non-sealed area, a separate shaft seal, a separate gasket or other more complicated sealing means for sealing with the bore, and a separate anti-rotation device. This complexity of conventional face seals has increased their cost so much as to preclude their use from many environments where a good seal can only be effected by face seals and also from environments where shaft seals give only marginal performance and face seals are far better. The very number of parts, each individually made, sets a high lower limit to their cost, and the more parts there are the more expensive is their assembly. Moreover, this same complexity is liable to result in addition of tolerances, misassembly, mishandling, and misinstallation, all of which make the seals more prone to failure.

An important object of the present invention is to provide a basically simple type of face seal. In its simplest case, the face seal employs a wall of the machine involved as one end and combines with it a single reinforced molded element that serves as spring, bellows, face, shaft seal, and torque lock. Even the more elaborate forms of the invention, which use additional elements, still result in a substantial reduction in the number and complexity of the parts.

A leading characteristic of the present invention is its use of an elastomeric spring acting largely in shear and partly in compression; moreover, this new spring is integral with and the same element as the bellows. This feature alone greatly simplifies the seal and substantially reduces the number of parts in the whole. It is also possible to use this same element as one of the face elements. Moreover, the elastomeric spring of this invention enables substantially greater deflection than is possible when helical metal springs are used; yet at the same time, the cost of production of these elastomeric springs is substantially less.

The cases of face seals heretofore in use have often been dented when subjected to shock, and their working parts have been worn as they slide or move against other working parts, as a result of vibration. Hence, users have been reluctant to put face seals in environments where they encounter considerable vibration or are liable to shock. The face seals of the present invention are much less sensitive to shock and far less likely to be damaged by vibration. The high hysteresis of elastomeric compositions involved in the seal of this invention tends to damp vibration.

Another important feature of the invention is that it makes it possible to tailor the load deflection curve to the space limitations, force requirements, amount of travel required, and other requirements. The seal can easily be adapted to fit into small available spaces while still having a load-deflection curve approaching the ideal of a constant force at all deflections.

In general, the invention comprises a mechanical seal having two relatively rotating faces, means for non-rotatably securing one of the faces to one portion of the sealed cavity and means for applying force to and firmly attaching the other face. The latter-mentioned means includes two circular stiffening members, one being smaller in diameter than the other, there being a constant radial clearance between them, and an elastomeric compound in that radial clearance connecting the stiffening members and so constructed that when the stiffening members are displaced axially relative to each other the elastomer is stressed mainly in shear.

Other objects and advantages of the invention will appear from the following description of some preferred forms thereof.

Figure 1:
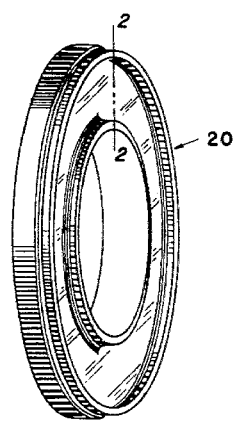
FIG. 1 is a view in perspective of a simple form of face seal component embodying the principles of the present invention.

*A simple face seal embodying the principles of the invention (FIGS. 1–6)*

FIGS. 1–6 show a seal 20 that may be termed a "shear sandwich." It incorporates an inner peripheral reinforcing member 21 and an outer peripheral reinforcing member 22, both comprising generally cylindrical metal rings. Either or both may be formed from sheet metal and punched or drawn so as to leave a radial end portion 23, which is generally of no functional significance. These two rings 21 and 22 are positioned concentrically about a common axis and there is a constant radial clearance between them. Joining them across this clearance is an elastomeric body 24 of any suitable elastomer bonded at its inner periphery to the inner peripheral member 21, and at its outer periphery to the outer peripheral member 22. As a result, the elastomer is stressed in shear by relative axial movement between the two metal rings 21 and 22. Unlike a clamped construction, the elastomer 24 cannot be lifted off the rings 21 and 22 because it is molded to them; therefore, its movement is mainly in shear with some minor amount of compression. In the form of device shown in FIGS. 1–6, the elastomeric body 24 has a diaphragm portion 25 that is substantially frusto-conical but is somewhat tapered as viewed in section, being thinner at its outer periphery than at its inner periphery. Moreover, the elastomer lies on both sides of the inner ring 21 to provide an elastomeric lining 26 on the inner periphery of the inner ring 21. Adjacent the outer ring 22 and extending out adjacent the portion 23 is a face member 27 which, in this instance, is an integral portion of the elastomeric body 24.

Figure 3:
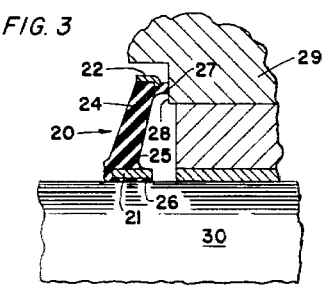
FIG. 3 is a fragmentary view in elevation and in section on a somewhat smaller scale than FIG. 2, showing the seal of FIGS. 1 and 2 installed on a shaft in face-sealing engagement with a bore wall in a normal installation position.

In its normal installation position shown in FIG. 3, the rubber diaphragm 25 has been moved in shear so that it exerts pressure upon the face 27 which is in contact with an end wall (or face) 28 forming part of the housing 29. The lining 26 fits snugly around a shaft 30 and provides a shaft-sealing gasket as well as holding the inner periphery against axial movement.

Figure 2:
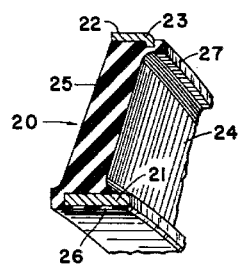
FIG. 2 is an enlarged fragmentary view in elevation and in section taken along the line 2—2 in FIG. 1.
Figure 4:
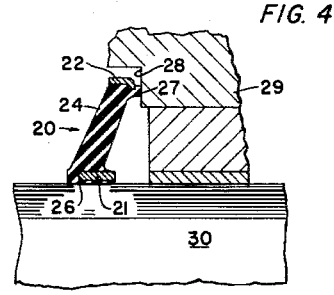
FIG. 4 is a view similar to FIG. 3 but with the seal installed at an extreme design-deflection position.
Figure 5:
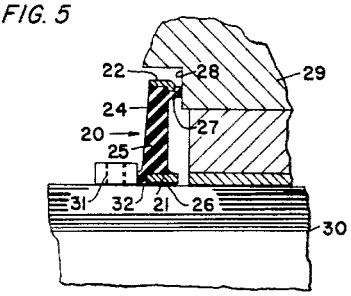
FIG. 5 is a view similar to FIGS. 3 and 4 showing the same seal installed at another nearly extreme design-deflection position in which the seal diaphragm is substantially radial.

An extreme position in which the seal 20 is close to the unstressed position of FIG. 2 is shown in FIG. 4, while in another nearly extreme position shown in FIG. 5 the elastomeric diaphragm 25 has been forced into a substantially radial position, the inner and outer rings 21 and 22 then being nearly in the same plane. By way of illustration, a collar 31 is shown secured onto the shaft 30 in FIG. 5 engaging a heel portion 32 of the seal 20 and retaining it against axial movement, although the lining 26 will ordinarily do this. These three FIGS. 3, 4, and 5 illustrate the great adaptability of the seal 20 as to the amount of movement that it can accommodate. In fact, the seal 20 can be moved well past the radial position of FIG. 5 to an inclination of 20° or so in the opposite direction, if desired.

Figure 6:
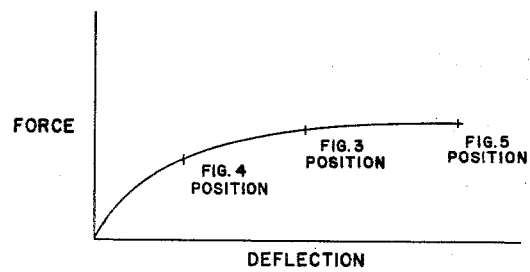
FIG. 6 is a graph showing a load-deflection curve of a typical seal like that of FIG. 1.

The graph in FIG. 6 shows an unusual characteristic in operation of the seal of FIGS. 1–5. The vertical axis indicates the force applied in an axial direction and the horizontal axis indicates the axial deflection resulting from that force. If the seal 20 operated in shear only, this curve would have a constant slope, starting at the origin and going at a constant angle to the axes. If the seal 20 operated only in compression the curve would be more complex, first going up like an arch with an upward sloping part followed by a downward sloping part dropping below the zero line and then curving back up again. The actual curve shown combines some of these features and possibly others. After an initial step portion the curve rises more gradually to what is nearly a plateau and it continues nearly level for a while. This is a remarkable characteristic compared to the nearly linear slope of present face seals. The approximate values of the positions of FIGS. 3, 4, and 5 have been marked on the curve in FIG. 6.

*A face seal component with a bonded face and a somewhat different load-deflection curve (FIGS. 7–9)*

Figure 7:
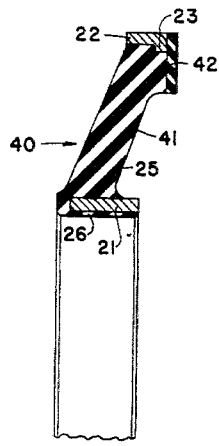
FIG. 7 is a fragmentary view in elevation and in section, similar to FIG. 2, of a modified form of seal also embodying the principles of the invention.
Figure 8:
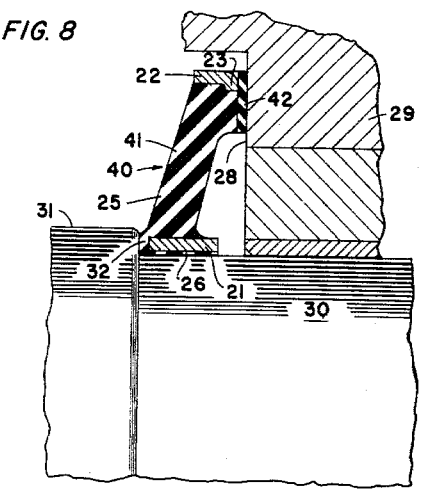
FIG. 8 is a fragmentary view in elevation and in section of an installation incorporating the seal of FIG. 7.
Figure 9:
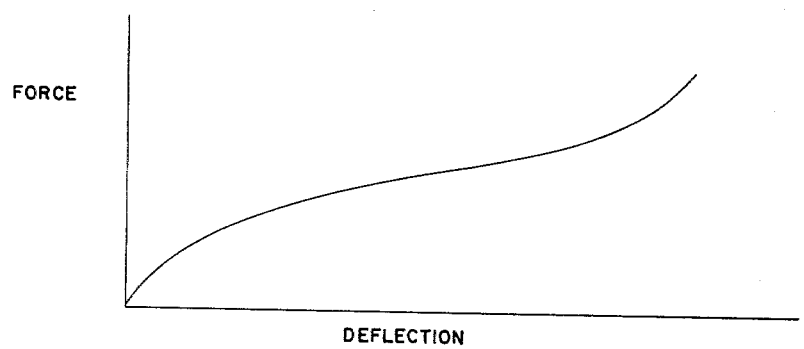
FIG. 9 is a graph showing a load-deflection curve typical of the seal of FIG. 7.

The seal 40 of FIGS. 7–9 is substantially identical to the seal of FIGS. 1–6 and most of the reference numerals thereon are therefore identical, but instead of having a body 24 with an integral face portion 27, it has a body 41 to which a Teflon, Viton, or other suitable face element 42 is bonded. Teflon, for example, provides a very low torque surface and can be bonded to elastomers. Its installation and operation (FIG. 8) are substantially as already described for FIG. 3, but its configuration is somewhat different, so that FIG. 9 shows a somewhat different curve with an upturn due to tensile stresses. There would also be an upturn in the curve of FIG. 6, except that the seal was differently designed, for operation only along the earlier part of a similar curve. The differences between the curves of FIGS. 6 and 9 represents the difference between two specific designs rather than differences between different types of seals. The load-deflection curve depends on the stiffness modulus of the elastomer used (not identical in these two curves), the geometrical configuration, the required variations in working distances, the dimensions of the sections, and other features.

To those skilled in the art to which this invention relates, many additional changes in construction and widely differing embodiments of the invention will suggest themselves without departing from the spirit and scope of the invention as defined in the claim.

What is claimed is:

A face seal for use between a shaft and a housing having relative rotation therebetween,
 a radial wall on a portion of said housing, providing one face of said seal,
 an inner generally cylindrical metal ring encircling said shaft,
 an outer generally cylindrical metal ring generally coaxial with said shaft and displaced axially from said inner ring,
 an elastomeric diaphragm in which both said rings are embedded,
 means adhesively bonding said diaphragm to said rings along a substantial axial length and providing a frusto-conical web joining them and providing an elastomeric liner for said inner ring serving to seal between it and said shaft,
 means preventing relative axial movement between said inner ring and said shaft, and
 a sealing face adjacent one end of said outer ring backed up by said diaphragm, for engagement with said radial wall, which thereby exerts force on said face in the direction of the other axial end of said outer ring, said diaphragm extending in the same axial direction and thereby being stressed in shear.

References Cited by the Examiner

UNITED STATES PATENTS

| | | | |
|---|---|---|---|
| 2,151,730 | 3/1939 | Basebe et al. | |
| 2,352,784 | 7/1944 | Geyer | 277—90 |
| 2,650,117 | 8/1953 | Chambers et al. | 277—42 |
| 2,740,648 | 4/1956 | Amblard | 277—81 X |
| 2,744,772 | 5/1956 | Amirault et al. | 277—43 |
| 2,814,513 | 11/1957 | Kupfert et al. | 277—89 X |
| 2,911,840 | 11/1959 | Muller et al. | |
| 2,916,313 | 12/1959 | Ziller et al. | 277—96 X |

FOREIGN PATENTS

| | | |
|---|---|---|
| 722,970 | 2/1955 | Great Britain. |

SAMUEL ROTHBERG, *Primary Examiner.*

LAVERNE D. GEIGER, *Examiner.*